United States Patent [19]

Micallef

[11] Patent Number: 5,389,756
[45] Date of Patent: Feb. 14, 1995

[54] PUSHROD SWITCH, ESPECIALLY A BRAKE LIGHT SWITCH, WITH SLIDING MEMBER AND SWITCH RESETTING MEANS

[75] Inventor: Pierre Micallef, St. Julians, Malta

[73] Assignee: Merit-Elektrik GmbH, Gummersbach, Germany

[21] Appl. No.: 58,498

[22] Filed: May 5, 1993

[30] Foreign Application Priority Data

May 12, 1992 [DE] Germany ............... 4215515

[51] Int. Cl.$^6$ ............................................. H01H 3/12
[52] U.S. Cl. ..................................... 200/345; 200/538
[58] Field of Search ............... 200/345, 341, 519, 520, 200/538

[56] References Cited

U.S. PATENT DOCUMENTS

| 3,251,971 | 5/1966 | Fraser | 200/345 X |
| 4,597,681 | 7/1986 | Hodges | 200/345 X |
| 4,996,400 | 2/1991 | Ricci et al. | 200/345 |
| 5,154,282 | 10/1992 | Pascal | 200/345 |

FOREIGN PATENT DOCUMENTS 2848875 11/1982 Germany .

Primary Examiner—Renee S. Luebke
Attorney, Agent, or Firm—Michael J. Striker

[57] ABSTRACT

A pushrod switch having a plastic switch housing, a pushrod with a plurality of peripheral teeth arranged in the switch housing, a movable sliding member contained within the switch housing and provided with opposing teeth engagable with the pushrod peripheral teeth and a locking catch device for releasably fixing the pushrod relative to the sliding member. The locking catch device includes two guide elements located in the sliding member and each shaped like a quarter shell; each have interior curved surfaces facing each other provided with the opposing teeth. The guide elements extend in longitudinal directions parallel to each other, are located on opposite sides of a longitudinal central plane extending vertically through both the sliding member and the pushrod, are located on opposite sides of a horizontal transverse central plane passing through the pushrod and rotated about 90° from the plane so as to be diagonally across from each other in the sliding member, and have longitudinal edges parallel to the plane. The guide elements are located in the sliding member so that it is possible to make the sliding member in a single piece by a two-piece injection mold, whose mold halves meet at a vertical longitudinal central plane of the sliding member and have shaping elements. The halves are formed so one shaping element forms the set of opposing teeth on the upper guide element and the other shaping element forms the set of opposing teeth on the lower guide element.

4 Claims, 3 Drawing Sheets

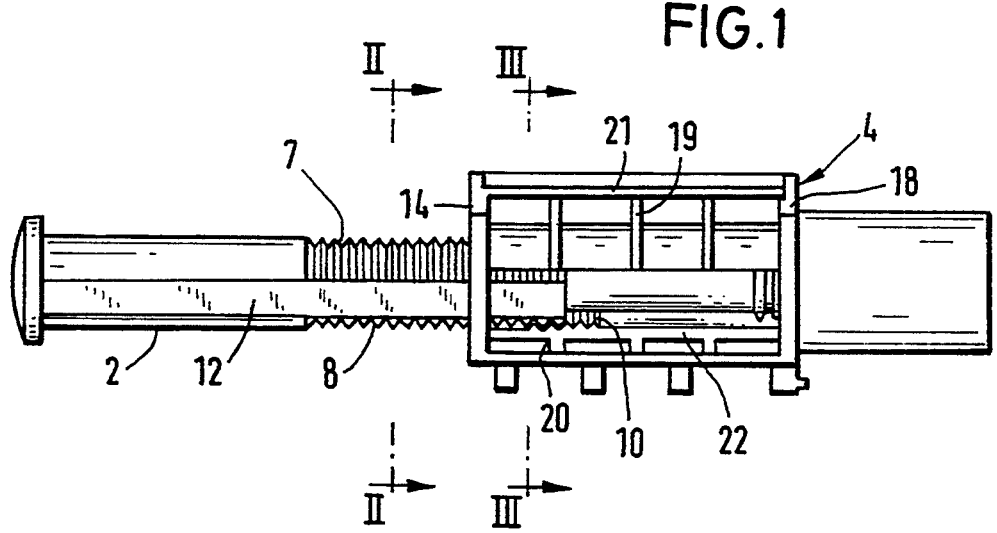
FIG.1
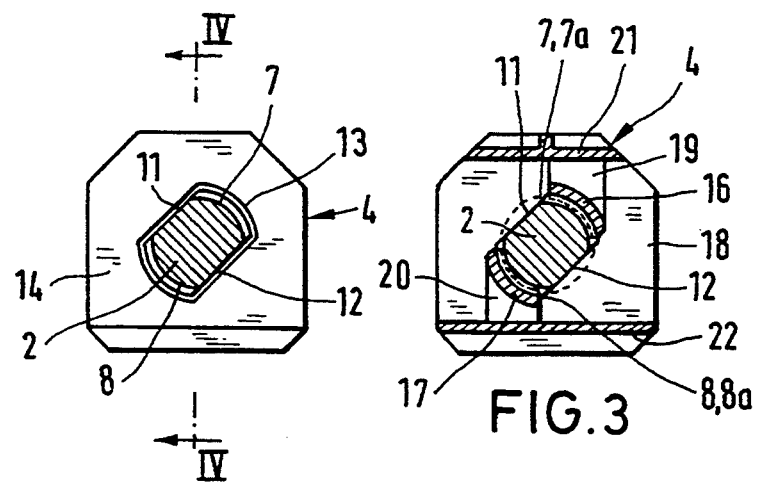
FIG.2
FIG.3
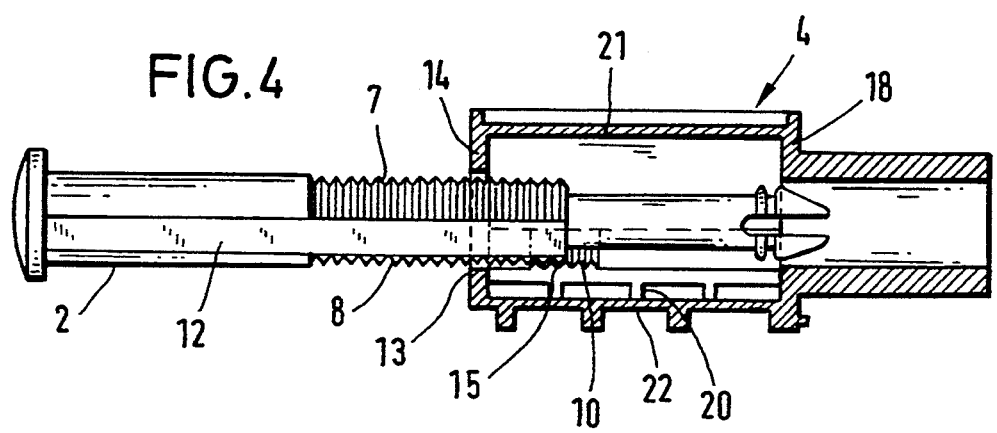
FIG.4

PUSHROD SWITCH, ESPECIALLY A BRAKE LIGHT SWITCH, WITH SLIDING MEMBER AND SWITCH RESETTING MEANS

BACKGROUND OF THE INVENTION

The present invention relates to a pushrod switch, especially a brake light switch, with a sliding member and switch resetting means. It also relates to a method of making the sliding member in one piece from a plastic material by injection molding.

A pushrod switch, particularly useful as a brake light switch, is known comprising a plastic switch housing, a pushrod arranged in the switch housing, a movable element comprising a sliding member engagable and movable with the pushrod, an electrical terminal element, contacting elements for making contact between the sliding member and the terminal element and means for switch resetting comprising a locking catch device for releasably fixing the pushrod relative to the sliding member.

In a known pushrod switch described in German Published Patent Application 2,848,875 C2 the pushrod is formed with an oval cross-section and has a plurality of catch teeth on each of the smaller sides of the substantially oval cross-sectioned pushrod. These catch teeth cooperate with an opposing catch tooth on each of two opposing sides of the sliding member and form together with the opposing teeth the locking catch device. In this type of structure there is a danger that both opposing teeth opposite each other in the sliding member experience premature wear after many manipulations of the pushrod and that the locking catch device thus no longer operates sufficiently reliably.

SUMMARY OF THE INVENTION

It is an object of the present invention to provide a pushrod switch, particularly a brake light switch, having switch resetting means and a sliding member, which does not have the above-described disadvantage.

It is another object of the present invention to provide an improved method of making a sliding member of a pushrod switch, particularly a brake light switch, in a single piece.

It is an additional object of the present invention to provide a pushrod switch, particularly a brake light switch, having switch resetting means and a sliding member, which is comparatively simple and does not require additional components, but operates reliably over the entire life of the switch, even with frequent resetting.

These objects and others which will be made more apparent hereinafter are attained in a pushrod switch, particularly useful as a brake light switch, comprising a plastic switch housing, a pushrod extending into the switch housing, a movable element comprising a sliding member engagable with the pushrod, an electrical terminal element, contacting elements for making contact between the sliding member and the terminal element and means for switch resetting comprising a locking catch device for releasably fixing the pushrod relative to the sliding member.

According to the invention, both the pushrod and the sliding member are provided with teeth which are structured to engage in each other. Two guide elements, each of which are shaped like a quarter shell, are positioned between opposing end walls of the sliding member and their interior curved surfaces face each other. The guide elements both extend in longitudinal directions parallel to each other. The interior curved surfaces of the two guide elements have a plurality of opposing teeth for engagement in the teeth of the pushrod.

The pushrod switch according to the invention is particularly suitable for a brake light switch. The locking catch device between the pushrod and the sliding member is improved by simple engineering methods without additional structural elements. The operation of the locking catch device is sufficiently reliable over the entire lifetime of the switch, even with frequent resetting of the pushrod relative to the sliding member and thus the switch.

Because of the opposing teeth on the interior curved or bearing surfaces of the guiding elements of the sliding member located on both sides of the pushrod and the teeth on the pushrod, the operability and reliability of the coupling between the pushrod and the sliding member is substantially improved. There is an additional advantage, namely that the opposing teeth on the sliding member are integrated in a one piece component for pushrod guiding. The guide elements of the sliding member only partially surround the pushrod so that the sliding member can be made from plastic in a comparatively simple manufacturing method described in more detail hereinbelow.

In a preferred embodiment of the invention a satisfactory resetting of the switch occurs in both operating directions, when the pitch or inclination angle of the teeth on the pushrod and the opposing teeth on the guide elements are equal.

Furthermore the resetting mechanism of the switch can be made without impairing the stability, switch life and particularly material savings, when the sliding member has parallel longitudinal side walls extending between the opposing end walls and the guide elements are supported on the longitudinal side walls in the sliding member by a plurality of transverse supporting pieces so as to form a hollow longitudinal wall section.

In a particularly advantageous embodiment the guide elements are located on both sides of a longitudinal central plane extending vertically through the sliding member and the pushrod and the guide elements are located diagonally across from each other in the sliding member. Also the guide elements have longitudinal edges parallel to the longitudinal central plane and the longitudinal edges are spaced from each other at a certain distance in a direction of the longitudinal central plane and also from a horizontal transverse central plane which is substantially perpendicular to the longitudinal central plane.

The above-described pushrod switch according to the invention can be made by a particularly convenient injection molding process according to the present invention. This injection molding method comprises the steps of providing a two-piece injection molding die consisting of two mold halves each having a shaping element extending therefrom and shaped to form the opposing teeth on the guide elements; pushing the two mold halves together to meet at the central longitudinal plane, so that one of the shaping elements forms the opposing teeth on the upper guide element adjacent the vertical longitudinal central plane and the other of the shaping element forms the second opposing teeth on the lower guide element; and forming the sliding member using the injection molding method.

This method is particularly advantageous, because an inner passage, for example between the opposing teeth of the pushrod in the sliding member, can be made without additional effort despite the small cross section of the pushrod and a correspondingly small inner diameter between the opposing teeth of the sliding member. Of course for an inner passage for the pushrod having a larger diameter and/or for a larger spacing between the opposing teeth of the sliding member, it is possible to easily make the opposing teeth with a collapsible core in the extrusion die. This is not possible however because of the small interior diameter of the inner passage. Further advantages are a perfect material compatability, friction reduction and a pitch reduction to as much as 0.7 mm or smaller.

In a particularly advantageous embodiment of the method each of the mold halves is formed with a transverse piece having a plane sliding surface so that, when the mold halves are pushed together to meet at the longitudinal central plane, the sliding surfaces bear on each other and the transverse pieces extend across the longitudinal central plane and the transverse pieces engage in opposing recesses of the die halves. The recesses and the transverse pieces are formed so that mold cavities for formation of the guide elements with the opposing teeth are formed when the mold halves are pushed together.

The method of the invention has the special advantage that the opposing teeth on the sliding member can be made easily in the injection molding process of the invention.

BRIEF DESCRIPTION OF THE DRAWING

The objects, features and advantages of the present invention will now be illustrated in more detail by the following detailed description, reference being made to the accompanying drawing in which:

FIG. 1 is side elevational view of a locking catch device between an adjustable pushrod and a sliding member for a brake light switch according to FIG. 5;

FIG. 2 is a cross-sectional view through the locking catch device of FIG. 1 taken along the section line II—II of FIG.1;

FIG. 3 is another cross-sectional view through the locking catch device of FIG. 1 taken along the section line III—III of FIG. 1;

FIG. 4 is a longitudinal cross-sectional view through the locking catch device of FIGS. 1 to 3 taken along section line IV—IV of FIG. 2;

DETAILED DESCRIPTION OF THE PREFERRED EMBODIMENTS

Figure 5:
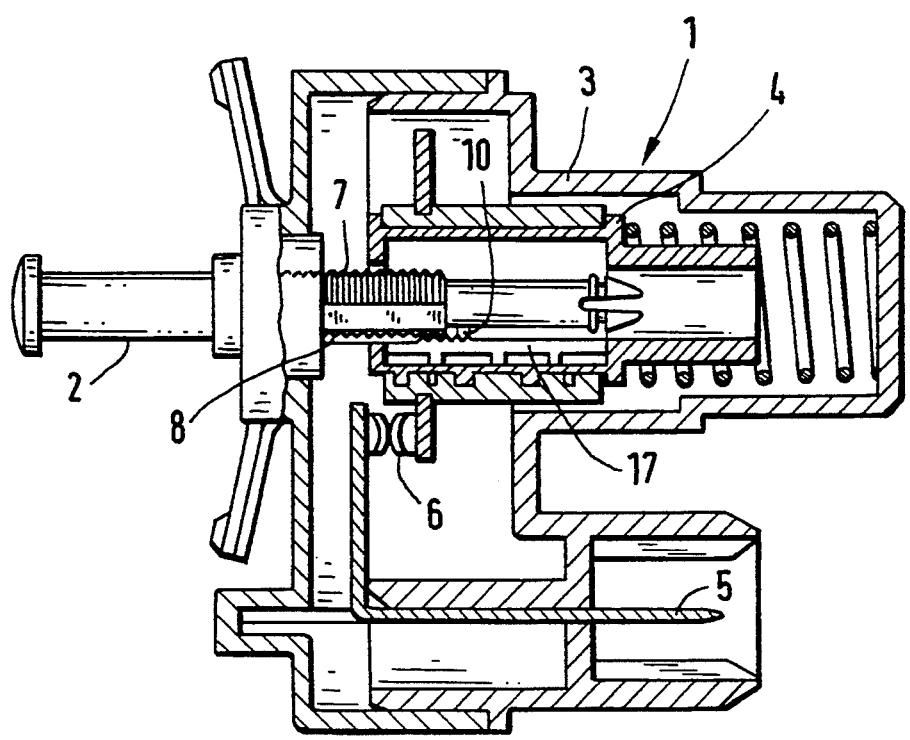
FIG. 5 is a purely schematic longitudinal cross-sectional view through a brake light switch according to the invention with a locking catch device between the pushrod and the sliding member of FIGS. 1 and 2.

The pushrod switch 1 shown in FIG. 5 has a pushrod 2 made of plastic, which can have a cross section of any arbitrary geometric shape, e.g. circular, oval, multicornered or the like. The pushrod 2 is arranged inside of a plastic switch housing 3 and is combined with a movable element which is a sliding member 4. The switch 1 has a terminal element 5 and contacting elements 6 for making contact between the sliding member 4 and the electrical terminal element 5.

The switch resetting means comprises a locking catch device for releasably fixing the push rod relative to the sliding member arranged between the pushrod 2 and the sliding member 4. This locking catch device includes a plurality of teeth 7,8 at least on a portion of the outer peripheral surface of the pushrod 2 and a plurality of opposing teeth 7a,8a formed and positioned for engagement with the teeth 7,8 of the pushrod 2.

The pushrod 2 can be flattened on one or both longitudinal sides 11,12 for prevention of turning relative to the opposing teeth 7a,8a and can be extended through an appropriately shaped throughgoing opening 13 in the end wall 14 having a flattened cross section.

As shown in detail in FIGS. 1, 3 and 4, the opposing teeth 7a,8a on the sliding member 4 and on the two opposing guide elements 16,17 on both sides of the teeth 7,8 of the pushrod 2 just like the teeth 7,8 on the pushrod 2 are formed as plurality of parallel teeth 15. The guide elements 16,17 have curved interior surfaces shaped like a quarter shell. The guide elements 16,17 extend parallel to each other on both sides of the pushrod 2 between the opposing end walls 14, 18 of the sliding member 4. The teeth 7,8 on the pushrod 2 and the opposing teeth 7a,8a on the sliding member 4 are formed with the same inclination angle or pitch on both sides of the pushrod. Moreover the guide elements 16,17 with the opposing teeth are supported by transverse pieces 19,20 so as to be parallel to the longitudinal side walls 21,22 of the sliding member 4 to form a hollow wall structure section only at certain places so that, because of the elasticity of the guide elements 16,17, an optimal engagement or locking of the opposing teeth 7a,8a with the teeth 7,8 of the pushrod shaft is attained.

Figure 6:
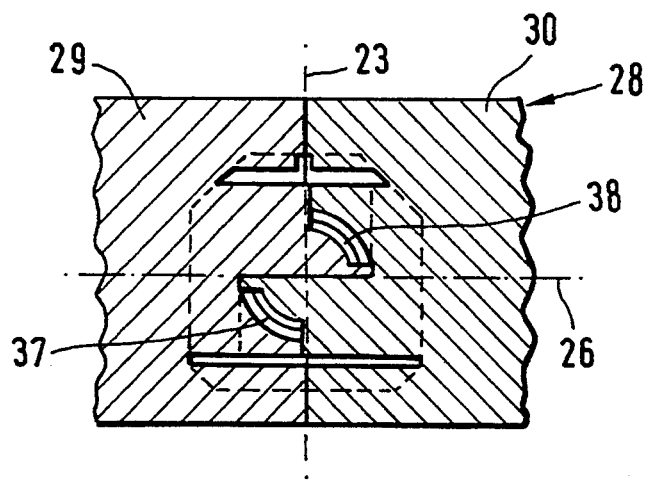
FIG. 6 is a cross-sectional view through a two-piece mold for making the sliding member with the locking catch device of FIGS. 1 to 4 enclosed in the two mold halves.
Figure 7:
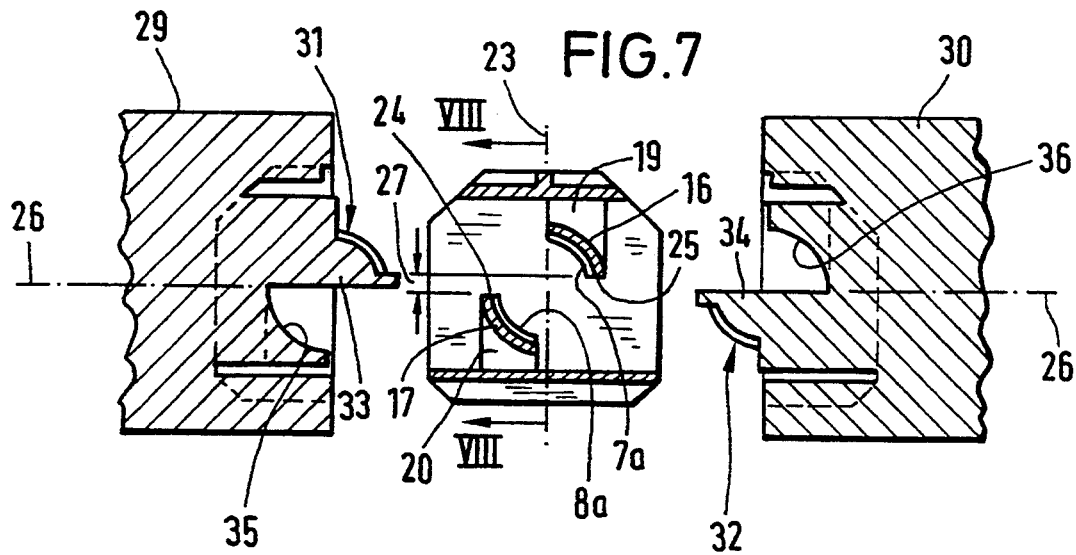
FIG. 7 is a cross-sectional view through the mold of FIG. 6 with a newly formed sliding member and with the mold opened with the mold halves separated.
Figure 8:
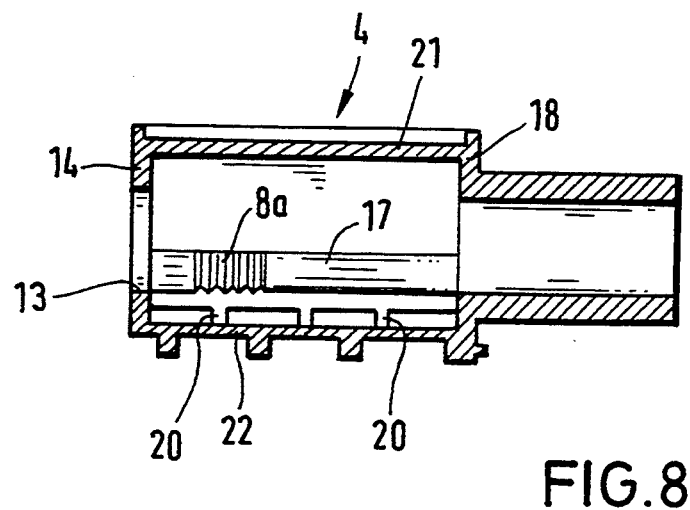
FIG. 8 is a longitudinal cross-sectional view through the sliding member taken along the section line VIII-—VIII of FIG. 7.

As shown particularly with the aid of FIGS. 1 to 4 and 6 to 8, the guide elements 16,17 with the opposing teeth 7a,8a for adjustment of the position of the pushrod 2 relative to the sliding member 4 are located on both sides of a longitudinal central plane 23 extending vertically through the sliding member 4 and the pushrod 2 and are located diagonally across from each other in the sliding member. Their longitudinal edges 24,25 parallel to the longitudinal central plane 23 are spaced from each other a distance 27 in a direction along the longitudinal central plane 23 and also from a horizontal transverse central plane 26 rotated about 90° relative to the longitudinal central plane 23 so that the sliding member 4 can be manufactured by a two-piece mold 28 as shown in FIGS. 6 and 7.

Both mold halves 29,30 of the mold 28 join each other during manufacture, as shown in detail in FIGS. 6 and 7, at the vertical longitudinal plane 23 of the sliding member 4 so that the shaping element 31 of the first die half 29 forms the first opposing teeth 7a on the upper guide element 16 adjacent to the vertical longitudinal central plane 23 and the shaping element 32 of the second mold half 30 forms the second opposing teeth 8a on the lower guide element 17.

Transverse pieces 33,34 of both mold halves 29,30 extend across the vertical separating plane between the mold halves 29,30 and bear on each other on mutual sliding surfaces, which run for their part on the horizontal transverse central plane 26 between both mold halves 29,30.

Furthermore the lateral transverse pieces 33,34 engage in the opposing mold halves in the closed mold in opposing recesses 35,36 of the die. The mold recesses 35,36 and the transverse pieces 33,34 in both mold halves 29,30 are formed so that they form a suitable mold chamber 37,38 between themselves for formation of the guide elements 16,17 with the opposing teeth 7a,8a in the sliding member 4.

While the invention has been illustrated and embodied in a pushrod switch, especially a brake light switch, with a sliding member and switch resetting means it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art,fairly constitute essential characteristics of the generic or specific aspects of this invention.

What is claimed is new and desired to be protected by Letters Patent is set forth in the appended claims.

We claim:

1. A pushrod switch comprising a plastic switch housing, a pushrod arranged in the switch housing, a movable element comprising a sliding member engagable with the pushrod and provided with opposing end walls through which the push rod is extendable, an electrical terminal element in the switch housing, contacting elements for making contact between the sliding member and the terminal element and means for switch resetting, wherein said means for switch resetting comprises a locking catch device for releasably fixing the pushrod relative to the sliding member, said locking catch device comprising two guide elements located between said opposing end walls in said sliding member, said guide elements are each shaped like a quarter shell and have interior curved surfaces facing each other, said guide elements extend in longitudinal directions parallel to each other, are located on opposite sides of a longitudinal central plane extending vertically through both the sliding member and the push rod, are located on opposite sides of a horizontal transverse central plane passing through the push rod and rotated about 90° from the central longitudinal plane so as to be diagonally across from each other in the sliding member, and have longitudinal edges parallel to the longitudinal central plane, said longitudinal edges being spaced from each other a predetermined distance in a direction of the longitudinal central plane and from the horizontal transverse central plane; and wherein said pushrod has a plurality of peripheral teeth on a periphery of the pushrod and the interior curved surfaces of the guide elements are provided with a plurality of opposing teeth, said guide elements and said peripheral teeth and said opposing teeth being structured and positioned so that said peripheral teeth of said pushrod are engagable with said opposing teeth of said guide elements.

2. A pushrod switch as defined in claim 1, wherein the peripheral teeth on the pushrod have a pitch and the opposing teeth on the guide elements have a pitch equal to the pitch of the peripheral teeth on the pushrod.

3. A pushrod switch as defined in claim 1, wherein the sliding member has parallel longitudinal side walls extending between the opposing end walls and the guide elements are supported on the longitudinal side walls in the sliding member by a plurality of transverse supporting pieces so as to form a hollow longitudinal wall section.

4. A pushrod switch as defined in claim 1, comprising a brake light switch.

* * * * *